Figure 1:
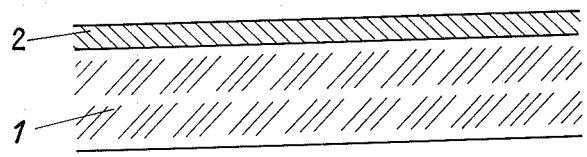

Dec. 13, 1960  P. RHEINBERGER ET AL  2,964,427
ULTRA-VIOLET FILTER
Filed March 6, 1958

The Inventors:
Peter Rheinberger
Max Auwärter

United States Patent Office 2,964,427
Patented Dec. 13, 1960

2,964,427

ULTRA-VIOLET FILTER

Peter Rheinberger, Vaduz, and Max Auwärter, Balzers, Liechtenstein, assignors to Geraetebau-Anstalt, Balzers, Liechtenstein, a corporation of Liechtenstein Filed Mar. 6, 1958, Ser. No. 719,695

Claims priority, application Switzerland Mar. 8, 1957

3 Claims. (Cl. 117—33.3)

The present invention relates to ultra-violet absorption filters and to a method for producing the same, and has the main object of providing an utra-violet absorption filter without any substantial color tint and yet absorbing the ultra-violet light below 300 m$\mu$. It is another object of the invention to provide a filter which is hard, and resistant to wearing-off and to atmospheric influences, without requiring a protective layer or glass as a protection against mechanical wear and tear.

It is known in principle for the purpose of producing light filters to deposit light absorbing substances in thin layers on carrier bases, particularly on glass, by vacuum vaporization or cathodic sputtering; the possibility of producing in this way a suitable absorption filter for a predetermined range of wave lengths depends on whether for the vaporization or cathodic sputtering suitable starting materials are available which form hard layers resistant to corrosion and absorbing the light as strongly as possible in a preselected range of wave lengths but as little as possible in the other ranges.

For the ultra-violet range of the spectrum it is known to deposit from the vapour phase on to a base an ultraviolet absorbing silicon layer, the thickness of which is chosen just so, that the visible light is yet allowed to pass to a sufficient extent. A compromise is then forcibly imposed, since the absorption curve of silicon does not run so steeply that a strong permeability to light in the visible range may be combined to the desirable extent in one and the same filter with a strong light absorption in the ultra-violet range. As a consequence of the selective light absorption of silicon in the visible range there results moreover an undesirable yellow tint of the filter. These same disadvantages occur likewise with other layer substances hitherto used for ultra-violet absorption filters, for example with the condensate obtained when evaporating a mixture of quartz and metallic silicon and precipitating the vapours generated on glass bases.

With the objects initially stated and other objects which will become apparent later from the specification in view, I provide a method for the production of an ultra-violet absorption filter, comprising the steps of transforming in vacuo a starting material containing the group consisting of cerium and cerium compounds into the vapor phase, and depositing the said material in vacuo from the vapor phase as a thin layer on a base. This transformation into the vapor phase may be carried out by vaporization in vacuo or by cathodic sputtering. The said starting material is preferably an oxide of cerium, or a mixture of cerium oxide with another oxide selected from the group consisting of titanium oxide, silicon oxide and chromium oxide. Preferably a mixture of $CeO_2$ and $SiO_2$ in the molecular ratio of substantially 2:1 is used.

The depositing from the vapor phase may be carried out in an oxygen atmosphere of very low pressure. A further substance capable of forming layers permeable to light may be transformed into the vapor phase and condensed on the said base simultaneously with the vapor phase of the said starting material. The thin layer formed by the said starting material or by the said starting material plus additional substance may be subject to heat treatment after condensation.

An ultra-violet absorption filter according to the present invention comprises in combination: a carrier base and a thin layer deposit thereon containing a substance of the group consisting of cerium and cerium compounds. Preferably the said layer deposit has an optical thickness of substantially $\lambda/2$, $\lambda$ being the mean wavelength of visible light, i.e. 550 m$\mu$. Such a filter has for example a light permeability not exceeding 30% at a wavelength of 3500 A., and of at least 90% at a wavelength of 4000 A. The said layer may itself have reflection—reducing properties, or the said filter may comprise in addition a layer having reflection reducing properties.

Figure 2:
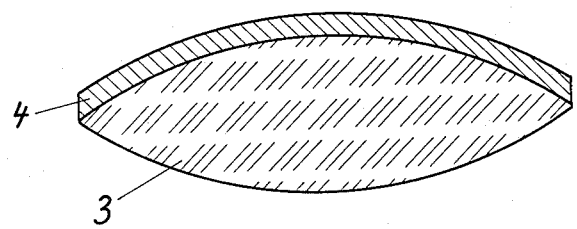

In order that the invention may be clearly understood and readily carried into effect, examples thereof will now be described in more detail, some of them with reference to the accompanying drawing, in which:

Fig. 1 is a diagrammatic section of a glass plate with an ultra-violet absorption filter layer deposited thereon, and Fig. 2 is a diagrammatic section of an optical lens provided with such a filter layer.

In order to obtain a good ultra-violet filter, one may for example evaporate from a small heatable crucible of a vaporization plant a compressed powdery mixture consisting of $CeO_2$ and $SiO_2$ in a molecular quantitative ratio of about 2:1, and condense on glass bases the vapours generated. Care has to be taken to insert the $SiO_2$—and $CeO_2$—powders as an intimate mixture into the vaporization boat. In this manner one obtains uniform layers.

At an approximate optical layer thickness of $\lambda/2$ (related to $\lambda=550$ m$\mu$) the same absorbs practically the complete ultra-violet range of the spectrum, and at the same time allow the visible range of 400–800 m$\mu$ to pass, practically without any absorption worth mentioning. No color tint is noticeable.

From the fact that layers consisting only of cerium oxide often do not give any better results than layers to which other oxides, preferably silicon oxide, have been admixed, it follows, that the cerium content as such is not to be considered the only decisive component. It appears that when starting the vapor deposition from the initial materials proposed according to the invention, compounds are formed as condensed layers which are the effective carriers proper of the ultra-violet absorption. Although it has been known that a certain comparatively high content in cerium may impart a corresponding capacity for ultra-violet absorption to glass melts, the quantity of cerium required for a certain capacity for ultra-violet absorption in these glasses per irradiated area unit is surprisingly a multiple of that required for a filter layer according to the invention for the same capacity of ultraviolet absorption. From experience in the production of ultra-violet absorbing glasses containing cerium one should have concluded, that for effective thin filter layers thicknesses of layer are necessary, which can no more be produced by deposition from the vapor phase. The method according to the invention therefore not only constitutes a new and surprising way for the production of ultraviolet filters of the same efficiency as cerium glass filters, but permits moreover to produce at will also ultra-violet absorbing layers of a capacity for absorption unattainable by cerium glass filters of convenient thickness (some millimetres), since such glasses become dim at too high a concentration in cerium.

Further investigations have shown that it is not indispensable to start from $CeO_2$ in the production. One may alternatively use other cerium compounds or metallic cerium, and one may use the same per se or together with other substances permeable to light. Compounds of silicon are particularly well suitable as additional layer substances. However, the same may be replaced by others, which shows that the extraordinary suitability of such mixtures is not to be explained simply by their content in silicon; for the pure silicon or silicon oxide filters do not give such good results in spite of the higher concentration in silicon. The vaporization of powdery mixtures of cerium and/or CeO and/or $CeO_2$ and/or $Ce_2O_3$ together with quartz powder has proved particularly suitable.

In carrying out the method in practice, e.g. $Ce_2O_3$ and quartz powder are introduced into a shallow vaporization boat of tungsten, and are vaporized by heating in a high vacuum. The vaporizing molecules are precipitated in the form of thin layers of high refractive index on previously cleaned glass plates in juxtaposition to the source of vaporization. It is for example advisable to use an optical layer thickness of $\lambda/2n$, wherein $\lambda$ denotes the mean wave length, and $n$ the refractive index of the layer. A variation in the thickness of the layer affords the possibility of shifting the boundary of absorption towards shorter or longer wave lengths. Conveniently on to this first layer, which at the boundary ranges of the visible spectrum yet has a relatively high capacity for reflection, a further layer of lower refractive index, e.g. of $SiO_2$, is precipitated from the vapor phase, and accordingly a combination of layers is produced which effects a reduction of reflection, so that a comparatively low capacity for reflection is attained over the entire spectrum.

In any case a filter according to the invention can only be formed when the starting material contains cerium in the free or bound state. It has often been found convenient to heat the layers during their formation or subsequently in order to attain a particularly strong effect of absorption in the ultra-violet range. It may be that this improved effect is caused by the formation of a colloidal dispersion of cerium in the layer.

If the ultra-violet filters according to the invention are to be produced consistently with same absorption curve, it is important to keep the composition of the starting substances and the temperature of application constant at any time. By small variations in the vaporization temperature, one is free to attain any desired variation in the absorption curve of the condensate for example with the aforesaid mixtures of cerium oxide and silicon oxide (quartz).

Thus in the example hereinabove the boundary of absorption may be shifted several $m\mu$ by variation of the mixture ratio between cerium oxide and silicon dioxide, apart from the aforesaid shifting by varying the thickness of layer; a higher content in cerium oxide shifts the boundary towards the ultra-violet side. Although the possibility of shifting this boundary appears relatively small, it may have some importance if it is the question of safely obviating any colour tint, e.g. for filter layers finding use in optical apparatus for visual operations.

Even mixtures of pure cerium and cerium oxides are suitable for carrying out the invention. When such mixtures are vaporized in a manner known in itself at a pressure of about $5 \times 10^{-5}$ to $3 \times 10^{-4}$ mm. Hg, with optical layer thicknesses of $\lambda/2$ of the mean wave length of the visible light $\lambda=550$ m$\mu$ a filter is obtained which cuts off the ultra-violet particularly sharply; such a filter may have a slight color tint which may however, be corrected by the measure described hereinabove for the reduction of the reflection.

In other filters the $SiO_2$ may be replaced by calcium oxide or by titanium oxide. However, the evaporation of calcium oxide offers some difficulties, as known from experience, owing to the high temperatures of vaporization required.

Sometimes it is of advantage, to subject the layers deposited from the vapor phase to a temperature treatment in oxygen. Thereby a higher capacity of adherence and resistance to wearing-off is attained, and in particular in this manner even the slight remnant of absorption in the visible range of wave lengths may be abolished without adversely affecting the capacity for ultra-violet absorption. Similar results are attained by precipitating the starting material from the vapor phase in active gases, preferably in oxygen at pressures between $10^{-4}$ and $10^{-5}$ mm. Hg.

This method, too, leads to filters completely free from absorption in the visible range and accordingly from color tints, which nevertheless possess the filter action desired to a marked extent, i.e. have a steep boundary between the visible and the ultra-violet range.

The oxides of cerium and of the other rare earths form an exception in the technique of vaporization. These substances may be evaporated in the usual manner in vacuo and condensed upon carrier bases without the danger of their disproportioning to non-saturated compounds absorbing light in the visible range, which danger exists with most of the other highly refractive materials. Cerium oxides and the oxides of the other rare earths have directly even without $O_2$ treatment or subsequent temperature treatment the property of adhering firmly, of being hard and completely free from absorption in the visible range. These layers are particularly hard, since they may be deposited from the vapor phase at an extremely high vacuum.

These special properties of evaporation are surprisingly offered also by the aforesaid mixtures consisting of cerium oxide and $SiO_2$ for the production of filters according to the invention. This is apparently an indication that $SiO_2$ in these particular conditions is brought to vaporization either in reaction with $CeO_2$ or as an independent molecule.

Very suitable ultra-violet filters according to the invention may be produced also with $CeO_2$ and $Cr_2O_3$. This mixture yields on the one hand a steep absorption boundary, which is caused by the cerium, and on the other hand a considerable absorption in the visible range, which may be kept smaller or larger at will, depending on the composition of the mixture. For example a composition ratio of one part of $CeO_2$ and one part of $Cr_2O_3$ yields a mean absorption of 70% in the visible range already with a total optical layer thickness of $\lambda/2$. While in general the production of ultra-violet filters free from absorption in the visible range is aimed at, the last-mentioned layers afford the possibility of applying on to spectacle lenses and similar optical appliances protective layers capable of absorption within the visible range, which are at the same time good ultra-violet filters. The same advantages can also be attained with layers which are not absorbing as such, provided that in addition to the invention further substances are admixed to them, which have a light absorbing effect in the visible range, for example metals such as iron, manganese, magnesium, chromium and the like.

By the method according to the invention ultra-violet absorption filters can be produced which at a wave length of 3500 A. have a permeability of 30% at a maximum, and at 4000 A. of at least 90%. Such a steepness of the absorption boundary can be attained with glass filters only by means of large thicknesses of the glass layer, since when the concentration of the absorbing medium exceeds a certain maximum value, no clear glass melts are attained any more.

Referring now to the accompanying drawing, Fig. 1 illustrates a glass plate 1 on which an ultra-violet absorption layer 2 is deposited, consisting of a substance or composition according to the present invention. The glass plate 1 with the ultra violet absorption layer deposited thereon may be used for photographic purposes, for a spectacle lens or in any optical apparatus where there exists the problem of eliminating ultra-violet rays from the path of the rays.

In optical instruments it is often very convenient to apply the ultra violet absorption filter layer directly on the surface of a lens and thus to dispense with separate holders for filter plates proper. Such a lens coated with an ultra-violet filter according to the present invention is illustrated in Fig. 2, wherein 3 denotes the body of the lens on which the absorption layer 4 is deposited. Naturally it is also possible to coat several surfaces of a lens system with the thin ultra-violet light absorbing layers according to the invention. This is advisable particularly when so strong an absorption is desired that too large a thickness would be required for a single filter. In this case it is advisable to distribute the ultra-violet absorption over several thin layers, since thin layers the thickness of which is of the order of magnitude of a wave length are known from experience better to adhere to their base than thicker layers which tend to flake off.

While we have described herein what may be considered typical and particularly useful examples of our said invention, we wish it to be understood that we do not limit ourselves to the particular dimensions, percentages and compositions, for obvious modifications will occur to a person skilled in the art.

What we claim as our invention and desire to secure by Letters Patent, is:

1. An ultra-violet filter comprising in combination: a base permeable to light and a hard, well adhering, mechanically and chemically resistant thin ultra-violet absorbing layer deposited in the dry state on said base, said layer containing a cerium oxide and at least one further substance belonging to the group consisting of titanium oxide, silicon oxide and chromium oxide, the molecular quantity of said cerium oxide being substantially twice that of the said other substance.

2. An ultra-violet filter comprising in combination: a base permeable to light and a hard, well adhering mechanically and chemically resistant thin ultra-violet absorbing layer deposited from the vapor phase in vacuo on said base, said layer containing a cerium oxide and at least one further substance of the group consisting of titanium oxide, silicon oxide and chromium oxide, the molecular quantity of said cerium oxide being substantially twice that of the said other substance.

3. An ultra-violet filter comprising in combination: a base permeable to light and a hard, well adhering, mechanically and chemically resistant layer deposited by cathode sputtering on said base, said layer containing a cerium oxide and at least one further substance of the group consisting of titanium oxide, silicon oxide and chromium oxide, the molecular quantity of said cerium oxide being substantially twice that of said other substance.

References Cited in the file of this patent

UNITED STATES PATENTS

| | | |
|---|---|---|
| 1,700,656 | Tillyer | Jan. 29, 1929 |
| 2,366,516 | Geffcken et al. | Jan. 2, 1945 |
| 2,636,420 | Ryan et al. | Apr. 28, 1953 |

FOREIGN PATENTS

| | | |
|---|---|---|
| 286,174 | Switzerland | Feb. 2, 1953 |